US011994295B2

(12) United States Patent
Naik et al.

(10) Patent No.: US 11,994,295 B2
(45) Date of Patent: May 28, 2024

(54) MULTI PRESSURE DROP SWIRLER FERRULE PLATE

(71) Applicant: General Electric Company, Schenectady, NY (US)

(72) Inventors: Pradeep Naik, Bengaluru (IN); Shai Birmaher, Cincinnati, OH (US); Kwanwoo Kim, Cincinnati, OH (US); Saket Singh, Bengaluru (IN); Perumallu Vukanti, Bengaluru (IN); Karthikeyan Sampath, Bengaluru (IN); Steven C. Vise, Loveland, OH (US); Nicholas R. Overman, Sharonville, OH (US); Michael A. Benjamin, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1 day.

(21) Appl. No.: 17/651,642

(22) Filed: Feb. 18, 2022

(65) Prior Publication Data

US 2023/0266006 A1 Aug. 24, 2023

(51) Int. Cl.
*F23R 3/16* (2006.01)
*F02C 7/22* (2006.01)

(52) U.S. Cl.
CPC . *F23R 3/16* (2013.01); *F02C 7/22* (2013.01)

(58) Field of Classification Search
CPC .................................... F23R 3/16; F02C 7/22
See application file for complete search history.

(56) References Cited

U.S. PATENT DOCUMENTS

| 6,035,645 A | 3/2000 | Bensaadi et al. |
| 6,834,505 B2 | 12/2004 | Al-Roub et al. |
| 7,013,649 B2 | 3/2006 | Monty |
| 7,104,066 B2 | 9/2006 | Leen et al. |
| 7,861,529 B2 | 1/2011 | Commaret et al. |
| 7,891,190 B2 | 2/2011 | Commaret et al. |
| 10,801,726 B2 | 10/2020 | Stevens et al. |
| 11,592,182 B1* | 2/2023 | Rangrej .................... F23R 3/26 |
| 2022/0412550 A1* | 12/2022 | Vise ....................... B05B 1/3421 |

FOREIGN PATENT DOCUMENTS

| CN | 105716113 B | 3/2019 |
| EP | 3417208 B1 | 8/2020 |

\* cited by examiner

*Primary Examiner* — Arun Goyal
(74) *Attorney, Agent, or Firm* — Venable LLP; Edward Kmett; Michele V. Frank (57) ABSTRACT

A swirler assembly includes a swirler having primary swirler with a primary swirler venturi, a swirler ferrule plate connected to the primary swirler, and a fuel nozzle disposed in the swirler ferrule plate. The swirler ferrule plate has an aft wall, an annular conical wall, and an annular cavity wall that together form an annular cavity. The annular cavity includes a plurality of inlet orifices, and at least one outlet orifice. A flow of oxidizer through the plurality of inlet orifices into the annular cavity incurs a first pressure drop from a first pressure of a pressure plenum to a second pressure lower than the first pressure, and a flow of the oxidizer from the annular cavity through the at least one outlet orifice into the primary swirler venturi incurs a second pressure drop from the second pressure to a third pressure lower than the second pressure.

20 Claims, 10 Drawing Sheets

MULTI PRESSURE DROP SWIRLER FERRULE PLATE

TECHNICAL FIELD

The present disclosure relates to a swirler ferrule plate for a swirler assembly in a combustor of a gas turbine engine.

BACKGROUND

Some conventional gas turbine engines are known to include rich-burn combustors that typically use a swirler integrated with a fuel nozzle to deliver a swirled fuel/air mixture to a combustor. A radial-radial swirler is one example of such a swirler and includes a primary radial swirler, a secondary radial swirler, and a swirler ferrule plate surrounding a fuel nozzle. The primary swirler includes a primary swirler venturi in which a primary flow of swirled air from the primary swirler mixes with fuel injected into the primary swirler venturi by the fuel nozzle. The swirler ferrule plate may include purge holes that provide a purge flow of air from a pressure plenum to the primary swirler venturi. The purge flow through the swirler ferrule plate is at a relatively high velocity as it exits the swirler ferrule plate into the primary swirler venturi.

BRIEF SUMMARY

According to one aspect, the present disclosure relates to a swirler assembly of a combustor, the swirler assembly defining a swirler assembly centerline therethrough. The swirler assembly of this aspect includes (i) a swirler including a primary swirler having a primary swirler venturi, (ii) a swirler ferrule plate connected to an upstream side of the primary swirler and including a fuel nozzle opening extended therethrough along the swirler assembly centerline, and (iii) a fuel nozzle disposed in the fuel nozzle opening of the swirler ferrule plate. The swirler ferrule plate includes (a) an aft wall extending radially outward from the fuel nozzle opening, (b) an annular conical wall extending from a radially inward portion of the aft wall at the fuel nozzle opening, and extending radially outward upstream from the aft wall, and (c) an annular cavity wall connecting a radially outward portion of the aft wall and an upstream end of the annular conical wall, an annular cavity being formed between the aft wall, the annular conical wall, and the annular cavity wall, the annular cavity wall including a plurality of inlet orifices therethrough. The swirler ferrule plate includes at least one outlet orifice providing fluid communication between the annular cavity and the primary swirler venturi, and a flow of an oxidizer through the plurality of inlet orifices into the annular cavity incurs a first pressure drop from a first pressure of a pressure plenum to a second pressure lower than the first pressure, and a flow of the oxidizer from the annular cavity through the at least one outlet orifice into the primary swirler venturi incurs a second pressure drop from the second pressure to a third pressure lower than the second pressure.

According to another aspect, the present disclosure relates to a method of operating a combustor of a gas turbine. With this aspect, the combustor includes (i) a pressure plenum, (ii) a swirler assembly including (a) a swirler having a primary swirler with a primary swirler venturi, and (b) a swirler ferrule plate connected to the primary swirler and including a fuel nozzle opening extended therethrough, and an annular pressure drop cavity, the annular pressure drop cavity having a plurality of inlet orifices in fluid communication with the pressure plenum and at least one outlet orifice in fluid communication with a primary swirler venturi region, and (iii) a fuel nozzle disposed in the fuel nozzle opening of the swirler ferrule plate. The method of operating the combustor of the gas turbine includes (1) providing a first flow of an oxidizer to the pressure plenum, the first flow of the oxidizer having a first pressure, (2) providing a second flow of the oxidizer from the pressure plenum to the annular pressure drop cavity of the swirler ferrule plate via the plurality of inlet orifices of the annular pressure drop cavity, the second flow of the oxidizer inducing a first pressure drop in the flow of the oxidizer from the first pressure to a second pressure lower than the first pressure in the annular pressure drop cavity, and (3) providing a third flow of the oxidizer from the annular pressure drop cavity to a primary swirler venturi region via the at least one outlet orifice of the swirler ferrule plate, the third flow of the oxidizer inducing a second pressure drop in the flow of the oxidizer from the second pressure to a third pressure lower than the second pressure.

Additional features, advantages, and embodiments of the present disclosure are set forth or apparent from consideration of the following detailed description, drawings, and claims. Moreover, it is to be understood that both the foregoing summary and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In a rich-burn combustor that includes a radial-radial swirler, air is provided from a pressure plenum of the combustor to a primary radial swirler, where a swirl is induced in the air by swirl vanes in the primary swirler as it flows through the primary swirler. The primary swirler also includes a venturi and a fuel nozzle injects fuel into the venturi where it is mixed with the swirled air flow of the primary swirler. A swirler ferrule plate surrounds the fuel nozzle and may include purge holes that provide a purge flow of air from the pressure plenum to the venturi. The purge flow through the swirler ferrule plate is at a relatively high pressure and a high exit velocity as it exits the swirler ferrule plate into the primary swirler venturi. The high velocity air stream from the ferrule plate directly interacts with the swirled air from of the primary swirler, which causes hydrodynamic instabilities and introduces higher perturbation in the flow of the primary swirler, particular before the fuel nozzle tip. These hydrodynamic instabilities drive instabilities in fuel distribution and heat release inside the combustor, leading to higher than desired amplitudes of pressure fluctuations inside the venturi.

The present disclosure addresses the foregoing to reduce the hydrodynamic instabilities and to keep the amplitudes of venturi pressure fluctuations at or below a desired level. According to the present disclosure, a swirler ferrule plate includes an annular cavity that has inlet orifices and outlet orifices. Pressurized air contained in a pressure plenum flows through the inlet orifices into the annular cavity of the swirler ferrule plate. This first flow of the air incurs a first pressure drop, such that the pressure of the air inside the annular cavity is less than the pressure of the air in the pressure plenum. The air in the annular cavity of the swirler ferrule plate then flows through the exit orifices into the primary swirler venturi. This second flow of the air incurs a second pressure drop, such that the pressure of the air flow inside the venturi is less than the pressure of the air in the annular cavity. As a result, the velocity of the flow coming out of the ferrule plate can be kept at a lower velocity and hence perturbations in the primary swirler air flow can be reduced. Thus, the present disclosure reduces the hydrodynamic instabilities that occur in the conventional ferrule plate.

Figure 1:
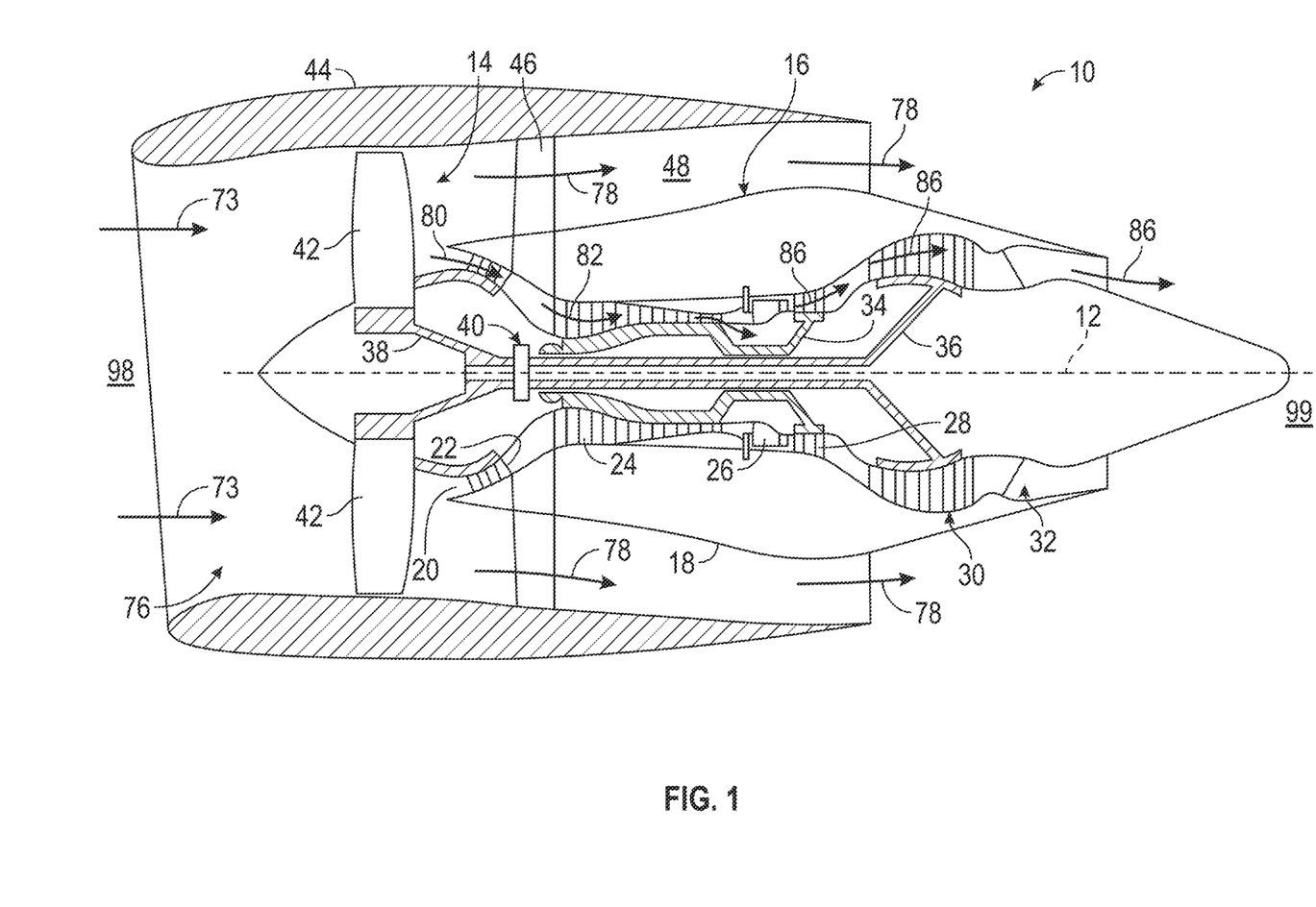
FIG. 1 is a schematic partial cross-sectional side view of an exemplary high by-pass turbofan jet engine, according to an aspect of the present disclosure.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, engine 10 has a longitudinal or axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20. The outer casing 18 encases or at least partially forms, in serial flow relationship, a compressor section having a booster or low pressure (LP) compressor 22, a high pressure (HP) compressor 24, a combustor 26, a turbine section including a high pressure (HP) turbine 28, a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration. In other embodiments, although not illustrated, the engine 10 may further include an intermediate pressure (IP) compressor and a turbine rotatable with an intermediate pressure shaft.

As shown in FIG. 1, the fan assembly 14 includes a plurality of fan blades 42 that are coupled to and extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
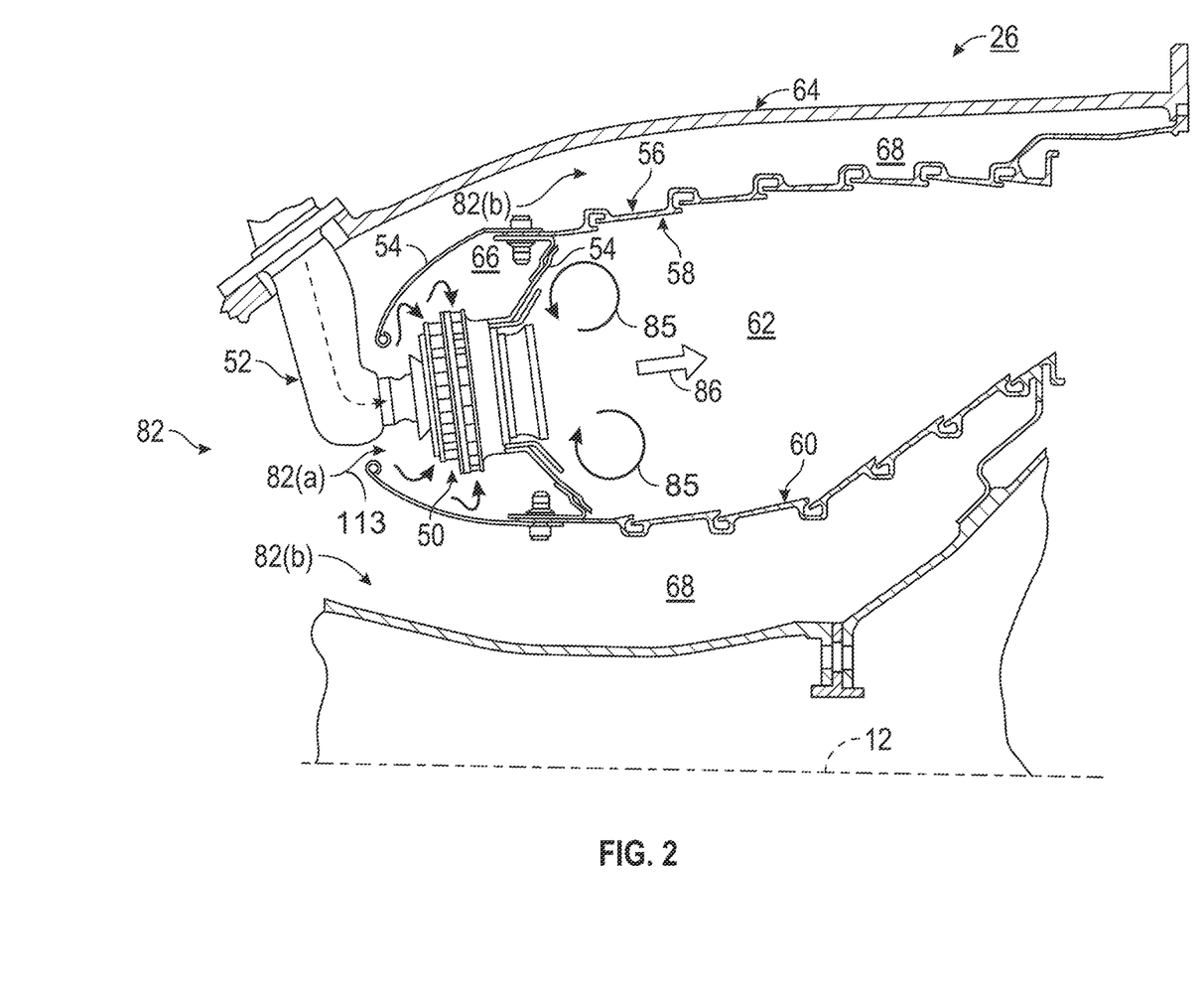
FIG. 2 is a partial cross-sectional side view of an exemplary combustion section, according to an aspect of the present disclosure.

FIG. 2 depicts an exemplary combustor 26 according to the present disclosure. In FIG. 2, combustor 26 includes a swirler assembly 50, fuel nozzle assembly 52, dome assembly 54, and an annular combustion liner 56 within outer casing 64. The annular combustion liner 56 includes an annular outer liner 58 and an annular inner liner 60 forming a combustion chamber 62 therebetween. A pressure plenum 66 is formed within the dome assembly 54. Referring back to FIG. 1, in operation, air 73 enters the nacelle 44, and a portion of the air 73 enters the compressor section as compressor inlet air flow 80, where it is compressed.

Another portion of the air 73 enters the bypass airflow passage 48 as a bypass airflow 78. In FIG. 2, air 82 from the compressor section (22/24) enters the combustor 26 via a diffuser (not shown). A portion of the air 82(a) enters the dome assembly 54 to the pressure plenum 66, while another portion of the air 82(b) passes to an outer flow passage 68 between the annular combustion liner 56 and the outer casing 64. As will be described below, air 82(a) in the pressure plenum 66 passes through the swirler assembly 50 to mix with fuel injected by the fuel nozzle assembly 52 and is ignited to generate combustion product gases 86.

Figure 3:
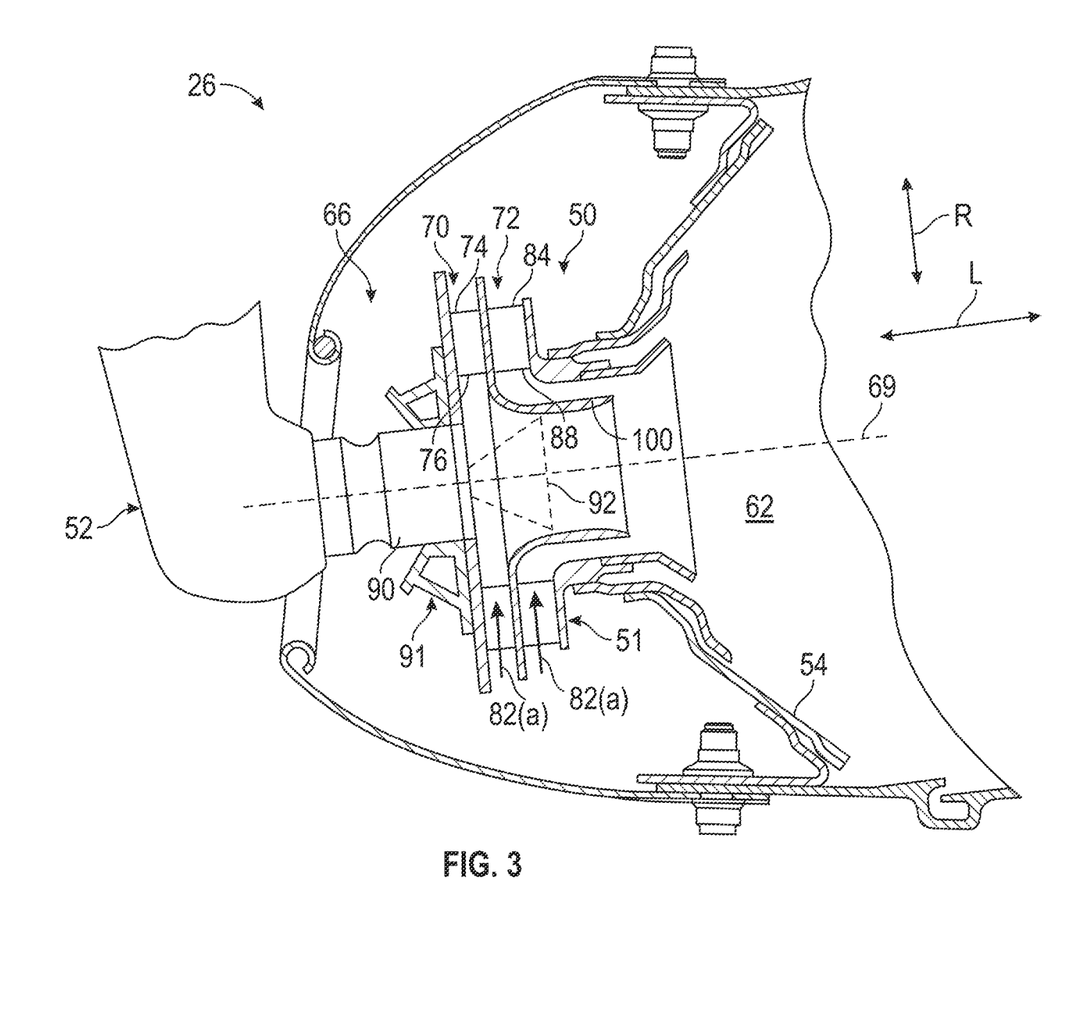
FIG. 3 is a partial cross-sectional side view of a forward portion of the of an exemplary combustion section of FIG. 2.
Figure 4:
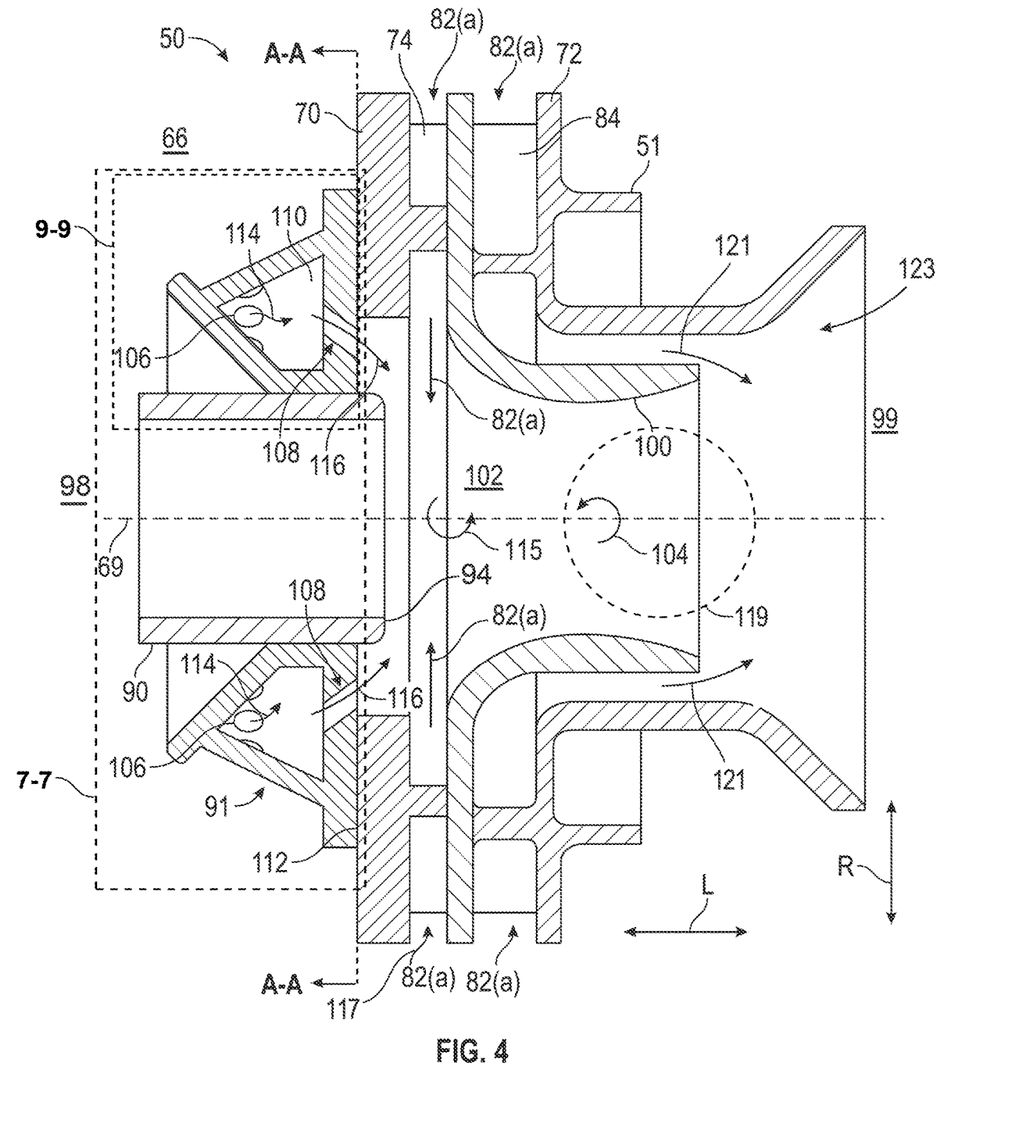
FIG. 4 is a partial cross-sectional side detail view of an exemplary fuel nozzle assembly, according to an aspect of the present disclosure.

Referring to FIGS. 3 and 4, FIG. 3 depicts a partial cross-sectional view of a forward portion of a combustor in the combustor 26, including swirler assembly 50, while FIG. 4 depicts a partial cross-sectional view of the swirler assembly 50. In FIG. 3, the combustor 26 defines its own longitudinal direction L relative to the engine centerline axis 12, and radial direction R relative to the engine centerline axis 12. The swirler assembly 50 is symmetrical about swirler assembly centerline 69, which extends in the longitudinal direction L and is perpendicular to the radial direction R. The swirler assembly 50 is suitably connected to dome assembly 54. The swirler assembly 50 includes a swirler 51 and a fuel nozzle 90 disposed within the swirler 51. As will be described in more detail below, the swirler 51 includes a primary swirler 70 that includes a primary swirler venturi 100, a secondary swirler 72, and a swirler ferrule plate 91. The primary swirler 70 includes a plurality of primary swirler swirl vanes 74. The primary swirler swirl vanes 74 are circumferentially disposed in a row such that each of the primary swirler swirl vanes 74 extends radially inward to a primary swirler vane lip 76. The primary swirler 70 also includes primary swirler venturi 100 that extends in the longitudinal direction L concentrically about swirler assembly centerline 69. Thus, the primary swirler 70 is configured for swirling a corresponding portion of the pressurized air 82(a) from the pressure plenum 66 radially inwardly from the plurality of primary swirler swirl vanes 74, and then, in a primary swirl direction 104 within the primary swirler 70 (i.e., either clockwise about swirler assembly centerline 69, or counter-clockwise about swirler assembly centerline 69).

The secondary swirler 72 similarly includes secondary swirler swirl vanes 84 that are circumferentially disposed in a row such that each of the secondary swirler swirl vanes 84 extends radially inward to a secondary swirler vane lip 88. Thus, the secondary swirler 72 is configured for swirling another corresponding portion of the pressurized air 82(a) from the pressure plenum 66 radially inward from the plurality of secondary swirler swirl vanes 84 of secondary swirler 72.

The fuel nozzle assembly 52 is seen to include a fuel nozzle 90 disposed within the swirler ferrule plate 91 of the swirler 51. The fuel nozzle 90 injects a fuel 92 into a primary swirler venturi region 102 (FIG. 4) of the primary swirler venturi 100 where it is mixed with the air 82(a) from primary swirler 70. The fuel and air mixture in the venturi further mixes downstream with the air 82(a) from secondary swirler 72 downstream of the primary swirler venturi 100. The primary swirler venturi 100 radially separates the air swirled from the primary swirler swirl vanes 74 and the secondary swirler swirl vanes 84.

In FIG. 4, swirler ferrule plate 91 interfaces with primary swirler 70 at the upstream side 112 of the primary swirler 70. Various structural embodiments of the swirler ferrule plate 91 will be discussed in more detail below. Briefly, swirler ferrule plate 91 includes an annular cavity 110 (which may also be referred to herein as "an annular pressure drop cavity"), a plurality of inlet orifices 106 and at least one outlet orifice 108. The plurality of inlet orifices 106 provide fluid communication between the pressure plenum 66 and the annular cavity 110, while the at least one outlet orifice provides fluid communication between the annular cavity 110 and the primary swirler venturi region 102 of the primary swirler.

In operation, the air 82(a) (also referred to herein as an oxidizer) in the pressure plenum 66 is pressurized at a first pressure $P_1$ due to the compression of the air by the compressor section, and a first flow 114 of a portion of the air 82(a) (oxidizer) flows from the pressure plenum 66 through the plurality of inlet orifices 106 into the annular cavity 110 of the swirler ferrule plate 91. The first flow 114 through the inlet orifices 106 to the annular cavity 110 incurs a first pressure drop $\Delta P_1$ from the first pressure $P_1$ to a second pressure $P_2$ that is lower than the first pressure $P_1$. Thus, the oxidizer within the annular cavity 110 is at the pressure $P_2$. A second flow 116 of the oxidizer contained within the annular cavity 110 then flows through the at least one outlet orifice 108 into the primary swirler venturi region 102. The second flow 116 of the oxidizer through the at least one outlet orifice 108 incurs a second pressure drop $\Delta P_2$ from the second pressure $P_2$ to a third pressure $P_3$ that is lower than the second pressure $P_2$. Thus, the total pressure drop $\Delta P_T$ through the swirler ferrule plate 91 may be defined as $\Delta P_T = \Delta P_1 + \Delta P_2$.

The size, shape, and/or number of the plurality of inlet orifices 106, the size/shape of the annular cavity 110, and the size, shape, and number of the at least one outlet orifice 108 may all be configured to obtain a desired $\Delta P_1$, $\Delta P_2$, and $\Delta P_T$. In some exemplary embodiments, the arrangement (e.g., size, shape, and number) of the plurality of inlet orifices 106, and the arrangement (e.g., size and shape) of the annular cavity 110 may be such as to provide a $\Delta P_1$ that is between ten percent and ninety percent of the $\Delta P_T$. The arrangement (e.g., size and shape) of the annular cavity 110 and the arrangement (e.g., size, shape, and number) of the at least one outlet orifice 108 may be such as to provide a $\Delta P_2$ that constitutes a remaining portion (percentage) of the $\Delta P_T$.

Figure 5:
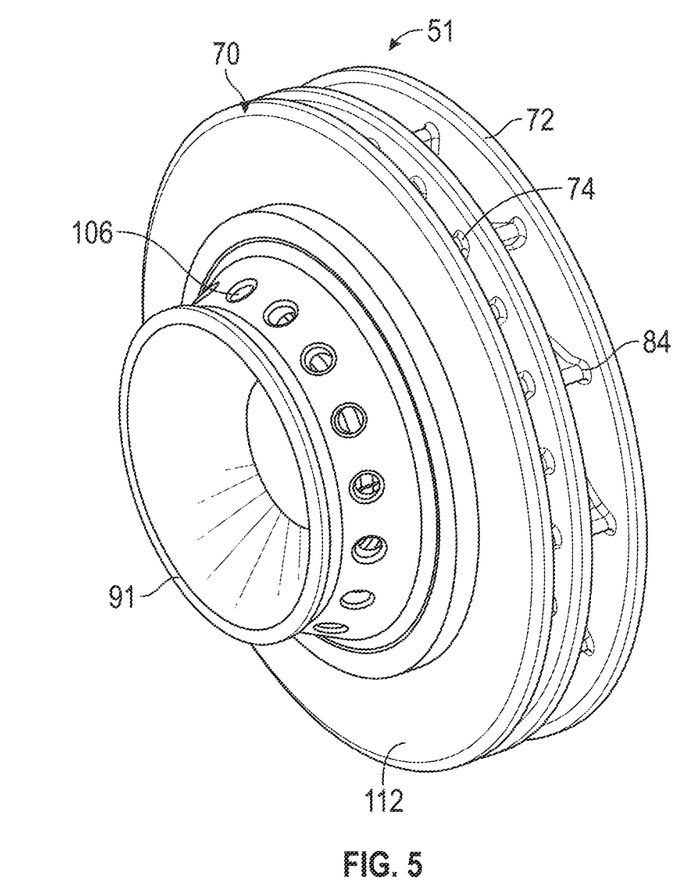
FIG. 5 is an aft-looking perspective view of an exemplary swirler assembly, according to an aspect of the present disclosure.

FIG. 5 depicts an aft-looking perspective view of an exemplary swirler 51 according to an aspect of the present disclosure. The swirler 51 is seen to include the primary swirler 70, secondary swirler 72, and swirler ferrule plate 91. The fuel nozzle 90, which forms a part of the swirler assembly 50, is not depicted in FIG. 5. As was described above with regard to FIG. 4, the swirler ferrule plate 91 interfaces with the primary swirler 70 at the upstream side 112 of the primary swirler 70. FIG. 5 also depicts exemplary inlet orifices 106 in the swirler ferrule plate 91. The exemplary inlet orifices 106 shown in FIG. 5 are seen to constitute a circular shaped orifice (i.e., circular holes), but, as will be described in more detail below, the inlet orifices 106 may be configured with other shapes instead.

Figure 6:
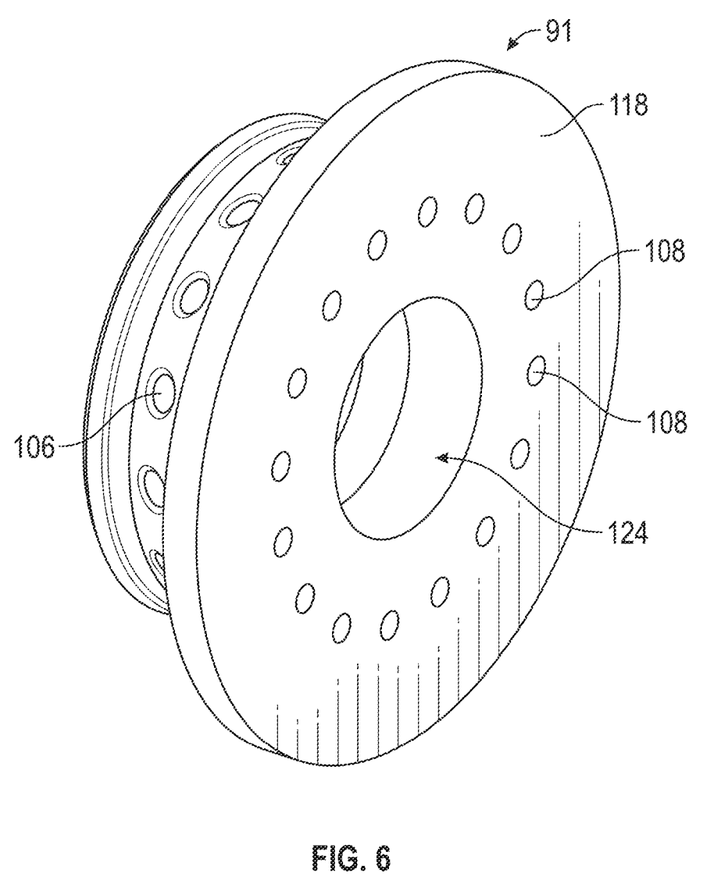
FIG. 6 is a forward-looking perspective view of an exemplary swirler ferrule plate, according to an aspect of the present disclosure.
Figure 7:
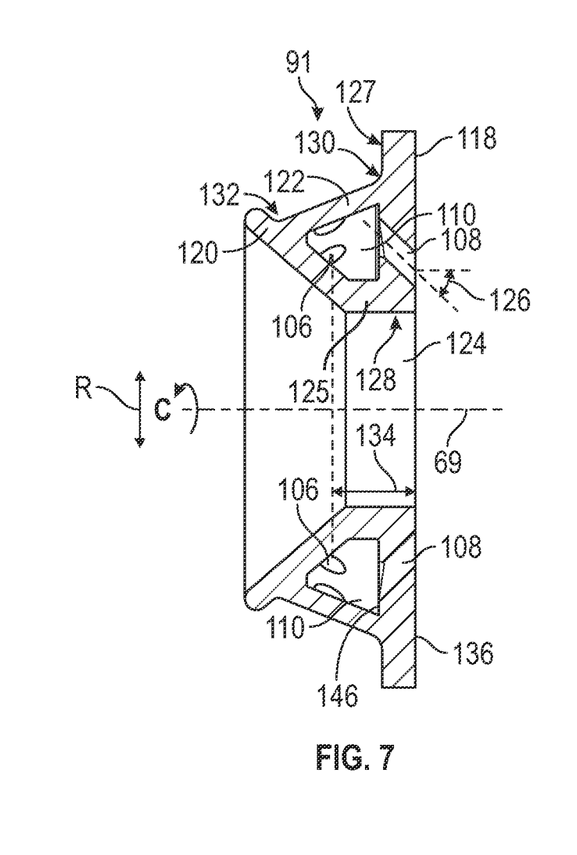
FIG. 7 is a partial cross-sectional side detail view, taken at detail 7-7 of FIG. 4, of an exemplary swirler ferrule plate, according to an aspect of the present disclosure.

FIG. 6 is a forward-looking perspective view of an exemplary swirler ferrule plate 91 according to an aspect of the present disclosure. FIG. 7 is a cross-sectional view of the exemplary swirler ferrule plate 91 taken at detail 7-7 as seen in FIG. 4. Swirler ferrule plate 91 is seen to include an aft wall 118 that extends radially outward in radial direction R from swirler assembly centerline 69, and also extends circumferentially about the swirler assembly centerline 69. A fuel nozzle opening 124 is defined through the aft wall 118. The aft wall 118 includes an axial wall portion 125 that extends upstream from an upstream side 127 of the aft wall 118 at the fuel nozzle opening 124. As was shown in FIG. 4, as part of the swirler assembly 50, the fuel nozzle 90 is disposed in the fuel nozzle opening 124 of the swirler ferrule plate 91. While aft wall 118 is depicted as being a generally cylindrical wall, the aft wall 118 is not limited to being cylindrical and may be other shapes, such as square, rectangular, hexagonal, etc., instead.

The swirler ferrule plate 91 also includes an annular conical wall 120 and an annular cavity wall 122. The annular conical wall 120 extends radially outward from a radially inward portion 128 of the axial wall portion 125 of the aft wall 118 at the fuel nozzle opening 124, and upstream from the radially inward portion 128 of the axial wall portion 125 of the aft wall 118 at the fuel nozzle opening 124. The annular conical wall also extends circumferentially about swirler assembly centerline 69, thereby, forming a radially inward conical opening in an upstream end of the fuel nozzle opening 124. The annular cavity wall 122 is connected to a radially outward portion 130 of the aft wall 118 and an upstream end 132 of the annular conical wall 120. The annular cavity wall 122 extends circumferentially about swirler assembly centerline 69. Thus, the aft wall 118, the annular conical wall 120, and the annular cavity wall 122 form the annular cavity 110.

The plurality of inlet orifices 106 are formed through the annular cavity wall 122. As was discussed above, the inlet orifices 106 provide a first flow of oxidizer from the pressure plenum 66 into the annular cavity 110. As was mentioned above, the plurality of inlet orifices may have different shapes and/or sizes. The inlet orifices 106 shown in FIGS. 6 and 7 are generally circular shaped holes. The inlet orifices 106 may, instead, include other shaped holes, such as triangular holes, trapezoidal shaped holes, oval shaped holes, rectangular shaped holes, etc. In addition, the inlet orifices 106 may be straight through holes, or, alternatively, may be tapered. For example, the inlet orifices 106 may have a smaller size on the outer end of the orifice (i.e., the outer side of the annular cavity wall 122 adjacent to the pressure plenum 66) and have a larger size on the inner end of the orifice (i.e., the inner side of the annular cavity wall 122 adjacent to the annular cavity 110). Alternatively, the inlet orifices 106 may have a larger size on the outer end of the orifice (i.e., the outer side of the annular cavity wall 122 adjacent to the pressure plenum 66) and have a smaller size on the inner end of the orifice (i.e., the inner side of the annular cavity wall 122 adjacent to the annular cavity 110).

As was mentioned above, the number of inlet orifices 106 through the annular cavity wall 122 may be varied based on a desired pressure drop $\Delta P_1$. In addition, the circumferential spacing of the inlet orifices 106 about the circumference of the annular cavity wall may be varied, such that the inlet orifices 106 may have a small circumferential spacing between orifices or a larger circumferential spacing between orifices. The circumferential spacing may also be unequal about the circumference, where, for example, a first inlet orifice and a second inlet orifice may be spaced apart a first distance about the circumference, and, then, a third inlet orifice may be spaced apart from the second inlet orifice a second distance greater than the first distance.

In FIG. 7, the inlet orifices 106 are shown as a single row about the circumference of the annular cavity wall 122, where the single row is arranged at an axial distance 134 from an aft surface 136 on a downstream side of the aft wall 118. However, the inlet orifices 106 may be arranged in a plurality of rows about the circumference of the annular cavity wall 122. For example, the inlet orifices 106 may be arranged in two rows about the circumference of the annular cavity wall 122, where a first row may be arranged at the axial distance 134 and a second row may be arranged at a second axial distance (not shown) that is either greater than or less than the axial distance 134. In addition, the inlet orifices 106 of the first row may be circumferentially staggered from the inlet orifices 106 of the second row.

The swirler ferrule plate 91 of FIG. 7 is also seen to include at least one outlet orifice 108. The at least one outlet orifice 108 provides fluid communication between the annular cavity 110 and the primary swirler venturi region 102. In FIG. 7, a plurality of outlet orifices 108 are included in the swirler ferrule plate 91. The outlet orifices 108 in FIG. 7 are shown as generally cylindrical holes through the aft wall 118. The outlet orifices 108, however, need not be cylindrical holes, but may be other shapes instead, such as a triangular shaped orifice, a rectangular shaped orifice, a trapezoidal shaped orifice, an oval shaped orifice, etc. In addition, similar to the inlet orifices 106, the outlet orifices 108 may be tapered. For example, the outlet orifices 108 may have a smaller size on the inlet end of the orifice (i.e., the inlet side of the outlet orifice at a forward surface 146 of the aft wall 118) and have a larger size on the outlet end of the orifice (i.e., the outlet side of the outlet orifice at the aft surface 136 of the aft wall 118). Alternatively, the outlet orifices 108 may have a larger size on the inlet end of the orifice and have a smaller size on the outlet end of the orifice.

The outlet orifices 108 in FIG. 7 are shown to be disposed at an outlet orifice radial angle 126. The outlet orifice radial angle 126 is shown extending at a radially inward angle from the forward surface 146 of the aft wall 118 to the aft surface 136 of the aft wall 118. The outlet orifice radial angle 126 is to provide the second flow of the oxidizer from the annular cavity 110 into the primary swirler venturi region 102 in a radially inward direction toward a tip 94 of the fuel nozzle 90. The outlet orifice radial angle 126 is shown with respect to the swirler assembly centerline 69, and may range from zero degrees (i.e., an outlet orifice that is aligned axially parallel with the swirler assembly centerline 69) to seventy degrees.

Figure 8:
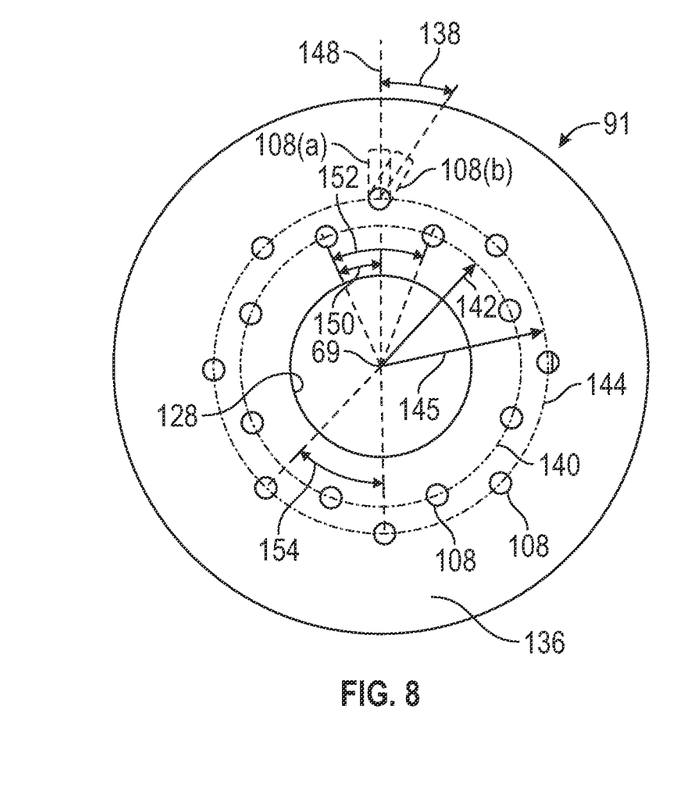
FIG. 8 is an aft forward-looking elevational view of an exemplary swirler ferrule plate, according to an aspect of the present disclosure.

FIG. 8 is an aft forward-looking elevational view of an exemplary swirler ferrule plate 91 according to the present disclosure. FIG. 8 depicts an arrangement of outlet orifices 108 through the aft surface 136 of the aft wall 118. Referring briefly back to FIG. 7, the outlet orifices 108 were shown at an outlet orifice radial angle 126 with respect to the swirler assembly centerline 69. The outlet orifice 108 shown in FIG. 7 is represented in FIG. 8 by the outlet orifice 108(a). The outlet orifices 108 may, however, further be arranged at an outlet orifice circumferential angle 138. That is, the outlet orifices 108 may be aligned at both the outlet orifice radial angle 126 and the outlet orifice circumferential angle 138 (see, e.g., outlet orifice 108(b)) so as to provide the second flow of oxidizer from the annular cavity 110 to the primary swirler venturi region 102 both radially inward of the swirler assembly centerline 69, and circumferentially about the swirler assembly centerline 69. In FIG. 8, the swirl direction of the outlet orifice 108(b) would be in a counter-clockwise direction about swirler assembly centerline 69. The outlet orifice circumferential angle 138 may, however, be opposite that shown in FIG. 8 so as to provide the second flow of the oxidizer in a clockwise direction about swirler assembly centerline 69. Whether the outlet orifice circumferential angle 138 provides for a clockwise flow of the oxidizer, or a counter-clockwise flow of the oxidizer, the direction may be arranged so as to be in either a co-swirl direction with the primary swirl direction 104, or a counter-swirl direction with the primary swirl direction 104 (see, FIG. 4) of the oxidizer provided by the primary swirler 70 in the primary swirler venturi region 102.

FIG. 8 also depicts an arrangement in which multiple rows of outlet orifices 108 may be included in the swirler ferrule plate 91. For example, a first row 140 of the outlet orifices 108, and a second row 144 of the outlet orifices 108 may be included in the swirler ferrule plate 91. The first row 140 of the outlet orifices 108 may be arranged circumferentially at a radial distance 142 from the swirler assembly centerline 69, while the second row 144 of the outlet orifices 108 may be arranged at a second radial distance 145 from the swirler assembly centerline 69. The outlet orifices 108 of the first row 140 may be circumferentially equally spaced apart from one another by an angular distance 152. The outlet orifices 108 of the second row 144 may be similar circumferentially equally spaced apart by an angular distance 154. Of course, the outlet orifices 108 of either the first row 140 or the second row 144 need not be circumferentially equally spaced, and may have a different angular distance 152 and a different angular distance 154 between individual outlet orifices 108 within each row. In addition, the outlet orifices 108 of the first row 140 may be staggered (i.e., offset) with respect to the outlet orifices 108 of the second row 144. For example, utilizing reference line 148 connecting swirler assembly centerline 69 and a center of one of the outlet orifices 108 of the second row 144 (e.g., center of outlet orifice 108(a)), the outlet orifices 108 of the first row 140 may be circumferentially offset by an offset angle 150 with respect to the outlet orifices 108 of the second row 144.

Figure 9:
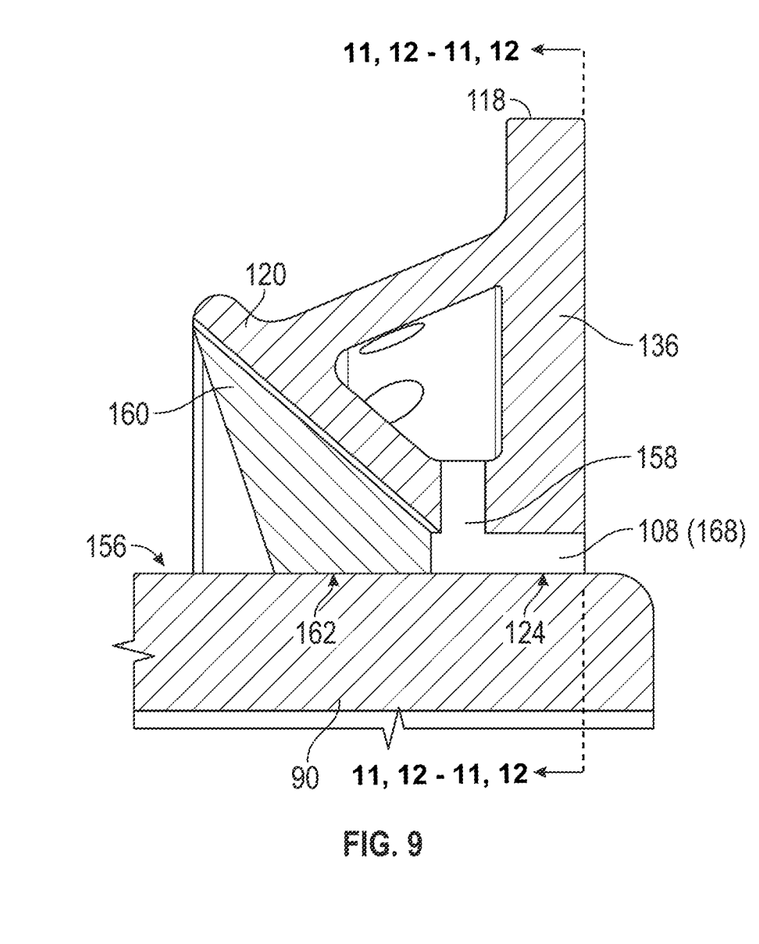
FIG. 9 is a partial cross-sectional side detail view, taken at detail 9-9 of FIG. 4, of an exemplary swirler ferrule plate outlet orifice arrangement, according to another aspect of the present disclosure.
Figure 10:
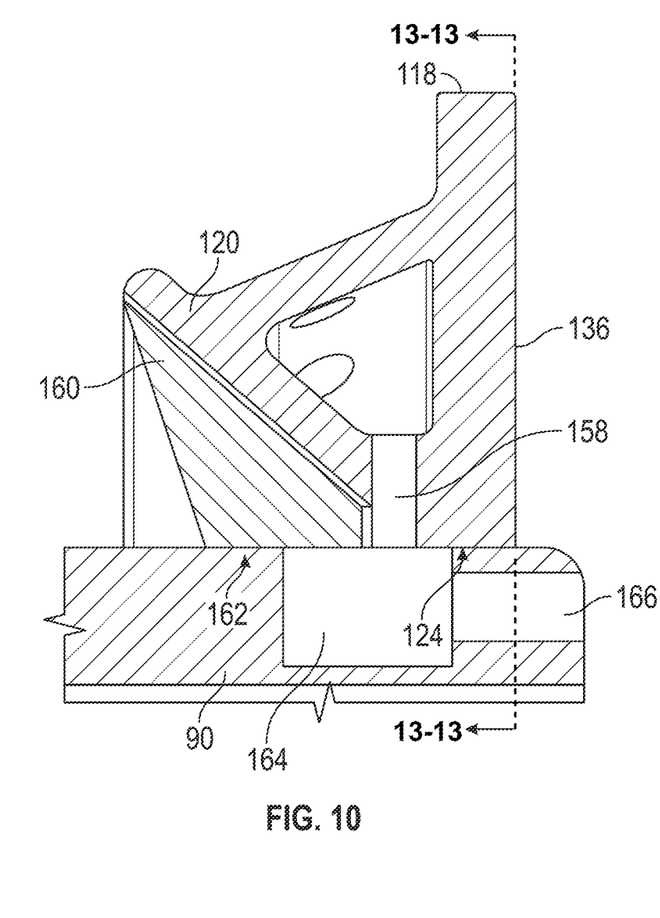
FIG. 10 is a partial cross-sectional side detail view of an exemplary swirler ferrule plate outlet orifice arrangement, according to another aspect of the present disclosure.
Figure 11:
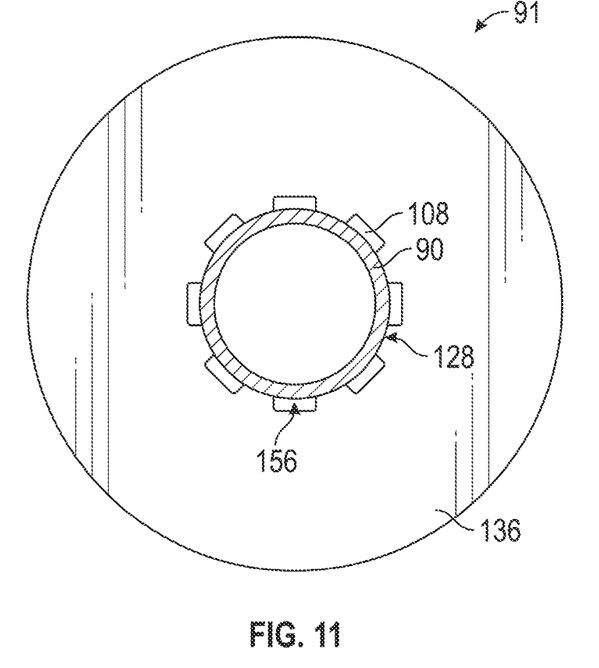
FIG. 11 is a partial cross-sectional aft forward-looking view taken at plane 11-11 in FIG. 9, corresponding to plane A-A of FIG. 4, of a swirler ferrule plate and fuel nozzle outlet orifice arrangement, according to yet another aspect of the present disclosure.
Figure 12:
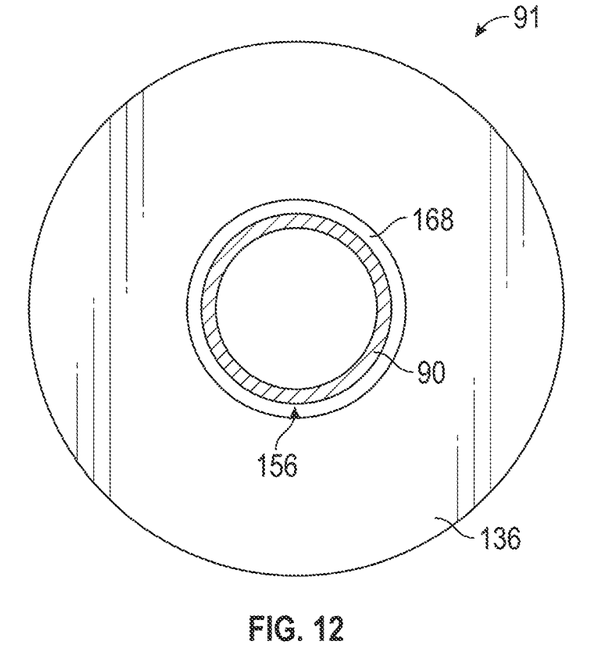
FIG. 12 is a partial cross-sectional aft forward-looking view taken at plane 12-12 of FIG. 9, corresponding to plane A-A of FIG. 4, of a swirler ferrule plate and fuel nozzle outlet orifice arrangement, according to yet another aspect of the present disclosure.

FIGS. 9 to 13 depict another arrangement of the outlet orifices 108 according to an aspect of the present disclosure. FIGS. 9 and 10 are partial cross-sectional views of alternative embodiments taken at detail 9-9 in FIG. 4. In FIG. 9, in comparison to FIG. 4 where the outlet orifice 108 is an angled hole through the aft wall 118, the outlet orifice 108 is shown to be located through the aft wall 118 at the fuel nozzle opening 124. That is, the outlet orifice 108 is formed between a fuel nozzle outer surface 156 of the fuel nozzle 90 and the swirler ferrule plate 91 at the fuel nozzle opening 124. FIG. 11 is a partial cross-sectional view taken at plane 11-11 of FIG. 9, which corresponds to plane A-A of FIG. 4. In FIG. 11, the outlet orifices 108 of this arrangement can be seen to be formed as a rectangular shaped outlet orifice, or a slot formed through the fuel nozzle opening 124 of the swirler ferrule plate 91. Thus, the fuel nozzle outer surface 156 of the fuel nozzle 90 defines the radially inner portion of the outlet orifice 108. Of course, similar to the previous aspects of the present disclosure described above, the outlet orifices 108 are not limited to being rectangular shaped, and other shapes may be implemented instead. In addition, the number, size, and spacing of the rectangular outlet orifices 108 may be varied similar to that described above. Moreover, while FIG. 11 depicts multiple rectangular shaped outlet orifices 108 circumferentially spaced about the fuel nozzle opening 124, a single annular outlet orifice may be implemented instead. For example, in FIG. 12, which is also a partial cross-sectional view taken at plane 12-12 of FIG. 9, which again, corresponds to plane A-A of FIG. 4, a single circumferential or annular outlet orifice 168 may be implemented instead of the multiple outlet orifices 108 of FIG. 11.

Referring back to FIG. 9, to provide for fluid communication between the annular cavity 110 and the outlet orifice 108, a channel 158 is included extending through a radially inward portion of the annular conical wall 120. A radially inward portion of the channel 158 defines a portion of the outlet orifice 108. In this aspect, to provide support for the annular conical wall 120, and to seal off the forward side of the annular cavity 110 where the channel 158 is formed, a support rib 160 may be included as part of the swirler ferrule plate 91. An inner surface 162 of the support rib 160 forms the fuel nozzle opening 124 of the swirler ferrule plate where the outlet orifice 108 is formed. The support rib 160 may be formed as a portion of an annular wall about the circumference of the swirler assembly centerline 69 where the outlet orifice 108 is formed. Thus, with this aspect, a flow path for the second flow of the oxidizer from the annular cavity 110 to the primary swirler venturi region 102 is through the channel 158 and, then, the outlet orifice 108. Again, the size, number, and arrangement of the foregoing flow path elements can be arranged to obtain a desired second pressure drop $\Delta P_2$. In addition, in the FIG. 12 aspect where an annular outlet orifice may be implemented, the channel 158 may constitute an annular channel about the entire circumference of the fuel nozzle opening 124.

Figure 13:
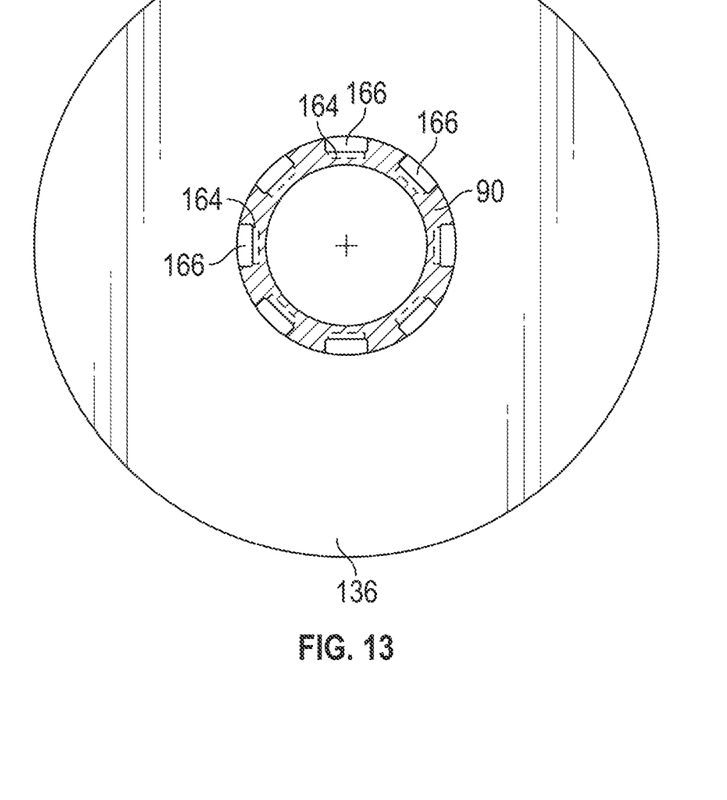
FIG. 13 is a partial cross-sectional aft forward-looking view taken at plane 13-13 of FIG. 10, corresponding to plane A-A of FIG. 4, of a swirler ferrule plate and fuel nozzle outlet orifice arrangement, according to still another aspect of the present disclosure.

FIG. 10 depicts another arrangement of the outlet orifices 108 according to an aspect of the present disclosure. The FIG. 10 aspect is somewhat similar to that of FIG. 9 in that it includes the channel 158 and the support rib 160, but the outlet orifice 108 is not formed through the aft wall 118. Rather, the fuel nozzle 90 includes a fuel nozzle cavity 164 formed in a radially outer portion of the fuel nozzle, and a fuel nozzle outlet orifice 166, the fuel nozzle outlet orifice 166 providing fluid communication between the fuel nozzle cavity 164 and the primary swirler venturi region 102. As seen in FIG. 13, which is a partial cross-sectional view taken at plane 13-13 of FIG. 10, which corresponds to plane A-A of FIG. 4, multiple fuel nozzle cavities 164 and a corresponding fuel nozzle outlet orifice 166 may be provided about the circumference of the fuel nozzle 90. Alternatively, while not depicted in the drawings, the fuel nozzle cavity 164 and/or the fuel nozzle outlet orifice 166 may be formed as an annular fuel nozzle cavity and an annular outlet orifice about the entire circumference of the fuel nozzle 90, similar to that shown in FIG. 12. In this case, the channel 158 may also be formed about the entire circumference of the fuel nozzle opening 124. Thus, the second flow of oxidizer in this aspect is from the annular cavity 110, through the channel 158 into the fuel nozzle cavity 164 and the exiting through the fuel nozzle outlet orifice 166 into the primary swirler venturi region 102.

Figure 14:
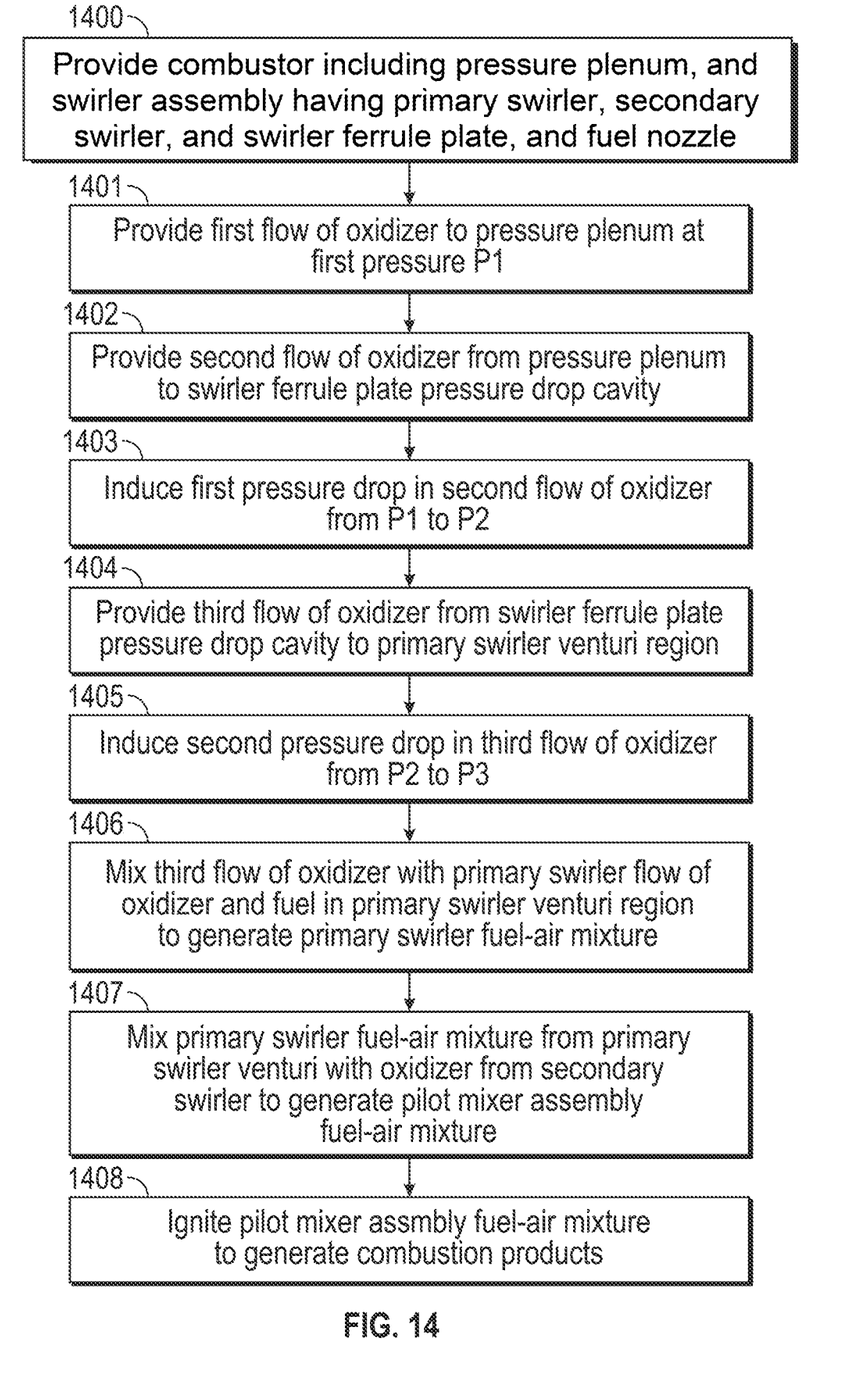
FIG. 14 is a flowchart of process steps for a method of operating a combustor, according to an aspect of the present disclosure.

Another aspect of the present disclosure relates to a method of operating a combustor of a gas turbine engine. FIG. 14 depicts a flowchart of process steps for the method of this aspect of the disclosure. In step 1400, a combustor 26 is provided. The combustor includes various components such as (i) the pressure plenum 66, and (ii) the swirler assembly 50 including (a) the swirler 51 having the primary swirler 70 with the primary swirler venturi 100, (b) the swirler ferrule plate 91 connected to the primary swirler 70 and including the fuel nozzle opening 124 extended therethrough, and an annular pressure drop cavity (annular cavity 110). The annular pressure drop cavity 110 has the plurality of inlet orifices 106 in fluid communication with the pressure plenum 66 and the at least one outlet orifice 108 in fluid communication with the primary swirler venturi region 102. The swirler assembly 50 further includes the fuel nozzle 90 disposed in the fuel nozzle opening 124 of the swirler ferrule plate 91. The structure and arrangement of the any of the foregoing combustor components may be any of those described above with regard to FIGS. 1 through 13.

Once the combustor according to the present disclosure has been provided, the remaining operational processes for operating the combustor are performed. As can be readily understood, the following processes of the method are performed via operation of the engine 10. In step 1401, a first flow 113 (FIG. 2) of oxidizer is provided to the pressure plenum 66, where the first flow 113 of oxidizer has a first pressure $P_1$. This process was described above where, in operation, engine 10 takes in air 73 and a portion of the compressor inlet air flow 80 enters the compressor section (22/24) where it is compressed, and, then, compressed air 82 is provided via a diffuser to the combustor 26, where a portion of the air 82(a) enters the pressure plenum 66.

Next, in step 1402, a second flow 114 of the oxidizer is provided from the pressure plenum 66 to the annular pressure drop cavity 110 of the swirler ferrule plate 91 via the plurality of inlet orifices 106 of the annular pressure drop cavity 110. Coincidentally, although not depicted in the flow chart of FIG. 14, a portion of the oxidizer (compressed air 82(a)) in the pressure plenum 66 is also provided to the swirler 51, where the oxidizer enters the primary swirler 70 and the primary swirler 70 induces a swirl in the flow of oxidizer therethrough to provide a swirled flow 115 (FIG. 4) of oxidizer into the primary swirler venturi 100 in a primary swirl direction 104. Returning to step 1403, the second flow 114 of the oxidizer through the inlet orifices 106 to the annular pressure drop cavity 110 induces a first pressure drop $\Delta P_1$ (step 1403) in the second flow 114 of the oxidizer from the first pressure $P_1$ to a second pressure $P_2$ lower than the first pressure, in the annular pressure drop cavity 110.

In step 1404, a third flow 116 of the oxidizer is provided from the annular pressure drop cavity 110 to a primary swirler venturi region 102 via the at least one outlet orifice 108 of the swirler ferrule plate 91 (flow 116). The third flow 116 of the oxidizer through the at least one outlet orifice 108 of the swirler ferrule plate 91 induces a second pressure drop $\Delta P_2$ (step 1405) in the third flow 116 of the oxidizer from the second pressure $P_2$ to a third pressure $P_3$ lower than the second pressure. The first pressure drop $\Delta P_1$ and the second pressure drop $\Delta P_2$ form a total pressure drop $\Delta P_T$ through the swirler ferrule plate 91. The first pressure drop $\Delta P_1$ may provide between ten percent and ninety percent of the total pressure drop $\Delta P_T$, while the second pressure drop $\Delta P_2$ may provide the remaining portion of the total pressure drop.

Next, in step 1406, the third flow 116 of the oxidizer into the primary swirler venturi region 102 is mixed with the swirled flow 115 of oxidizer from the primary swirler 70. The swirled flow 115 of oxidizer from the primary swirler 70 was described above, and the flow of oxidizer (compressed air 82(a)) from the pressure plenum 66 to the primary swirler 70 that is swirled by the primary swirler 70 to generate the swirled flow 115 of oxidizer may be referred to as providing a fourth flow 117 of the oxidizer from the pressure plenum 66 to the primary swirler 70. Fuel 92 is also injected into the primary swirler venturi region 102 of the primary swirler venturi 100 by the fuel nozzle 90. The fuel 92 mixes with the third flow 116 of the oxidizer and the swirled flow 115 of oxidizer from the primary swirler 70 to generate a primary swirler fuel-air mixture 119. The primary swirler fuel-air mixture 119 travels toward the downstream end 99 of the swirler assembly 50 through the primary swirler venturi 100. The primary swirler fuel-air mixture 119 is then mixed with a secondary swirler swirled oxidizer 121 (FIG. 4) from the secondary swirler 72 in a flare cone 123 downstream of the primary swirler venturi 100 to generate a swirler assembly fuel-air mixture 85 (FIG. 2) (step 1407). The swirler assembly fuel-air mixture 85 is then ignited in the combustion chamber 62 to form combustion product gases 86 (step 1408).

While the foregoing description relates generally to a gas turbine engine, it can readily be understood that the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A swirler assembly of a combustor, the swirler assembly defining a swirler assembly centerline therethrough, the swirler assembly comprising: a swirler including a primary swirler having a primary swirler venturi, a swirler ferrule plate connected to an upstream side of the primary swirler and including a fuel nozzle opening extended therethrough along the swirler assembly centerline; and a fuel nozzle disposed in the fuel nozzle opening of the swirler ferrule plate, the swirler ferrule plate comprising: (a) an aft wall extending radially outward from the fuel nozzle opening, (b) an annular conical wall extending from a radially inward portion of the aft wall at the fuel nozzle opening, and extending radially outward upstream from the aft wall, and (c) an annular cavity wall connecting a radially outward portion of the aft wall and an upstream end of the annular conical wall, an annular cavity being formed between the aft wall, the annular conical wall, and the annular cavity wall, the annular cavity wall including a plurality of inlet orifices therethrough, wherein the swirler ferrule plate includes at least one outlet orifice providing fluid communication between the annular cavity and the primary swirler venturi, and wherein a flow of an oxidizer through the plurality of inlet orifices into the annular cavity incurs a first pressure drop from a first pressure of a pressure plenum to a second pressure lower than the first pressure, and a flow of the oxidizer from the annular cavity through the at least one outlet orifice into the primary swirler venturi incurs a second pressure drop from the second pressure to a third pressure lower than the second pressure.

The swirler assembly according to any preceding clause, wherein the at least one outlet orifice comprises a plurality of outlet orifices arranged axially through the aft wall with respect to the swirler assembly centerline.

The swirler assembly according to any preceding clause, wherein the at least one outlet orifice comprises a plurality of outlet orifices arranged through the aft wall at a radially inward angle with respect to the swirler assembly centerline, from an upstream side of the aft wall to a downstream side of the aft wall, so as to direct the flow of the oxidizer therethrough toward a tip of the fuel nozzle.

The swirler assembly according to any preceding clause, wherein the primary swirler has a swirl direction and the plurality of outlet orifices are further arranged at an angle circumferentially in a co-swirl or counter-swirl direction with the swirl direction of the primary swirler.

The swirler assembly according to any preceding clause, wherein the first pressure drop comprises between ten percent and ninety percent of a total pressure drop through the swirler ferrule plate, and the second pressure drop comprises a remaining portion of the total pressure drop through the swirler ferrule plate.

The swirler assembly according to any preceding clause, wherein the at least one outlet orifice comprises a plurality of outlet orifices each defined adjacent to the fuel nozzle, wherein an outer surface of the fuel nozzle defines a portion of each outlet orifice.

The swirler assembly according to any preceding clause, wherein the at least one outlet orifice comprises a plurality of outlet orifices, wherein the fuel nozzle includes a plurality of fuel nozzle cavities on a radially outer portion of the fuel nozzle, each of the plurality of fuel nozzle cavities being in fluid communication with the annular cavity via a respective outlet orifice among the plurality of outlet orifices, and wherein each fuel nozzle cavity includes a fuel nozzle outlet orifice providing fluid communication between the fuel nozzle cavity and the primary swirler venturi.

The swirler assembly according to any preceding clause, wherein the at least one outlet orifice comprises an annular channel defined through the fuel nozzle opening of the swirler ferrule plate, and wherein the fuel nozzle comprises (i) an annular fuel nozzle cavity in a radially outer portion of the fuel nozzle, the annular fuel nozzle cavity being in fluid communication with the annular cavity via the annular channel, and (ii) at least one fuel nozzle outlet orifice providing fluid communication between the annular fuel nozzle cavity and the primary swirler venturi.

The swirler assembly according to any preceding clause, wherein the at least one fuel nozzle outlet orifice comprises an annular outlet orifice.

The swirler assembly according to any preceding clause, wherein the at least one outlet orifice comprises a plurality of rows of outlet orifices circumferentially arranged through the aft wall, each row of the plurality of rows of outlet orifices being arranged at a different radial distance from the swirler assembly centerline.

The swirler assembly according to any preceding clause, wherein the at least one outlet orifice comprises any one of a circular shaped orifice, a rectangular shaped orifice, a triangular shaped orifice, and a trapezoidal shaped orifice.

The swirler assembly according to any preceding clause, wherein the at least one outlet orifice is tapered from a first size at a forward surface of the aft wall to a second size at an aft surface of the aft wall, the first size being different from the second size.

A method of operating a combustor of a gas turbine, the combustor comprising (i) a pressure plenum, (ii) a swirler assembly including (a) a swirler having a primary swirler with a primary swirler venturi, and (b) a swirler ferrule plate connected to the primary swirler and including a fuel nozzle opening extended therethrough, and an annular pressure drop cavity, the annular pressure drop cavity having a plurality of inlet orifices in fluid communication with the pressure plenum and at least one outlet orifice in fluid communication with a primary swirler venturi region, and (iii) a fuel nozzle disposed in the fuel nozzle opening of the swirler ferrule plate, the method comprising: providing a first flow of an oxidizer to the pressure plenum, the first flow of the oxidizer having a first pressure, providing a second flow of the oxidizer from the pressure plenum to the annular pressure drop cavity of the swirler ferrule plate via the plurality of inlet orifices of the annular pressure drop cavity, the second flow of the oxidizer inducing a first pressure drop in the flow of the oxidizer from the first pressure to a second pressure lower than the first pressure in the annular pressure drop cavity, and providing a third flow of the oxidizer from the annular pressure drop cavity to a primary swirler venturi region via the at least one outlet orifice of the swirler ferrule plate, the third flow of the oxidizer inducing a second pressure drop in the flow of the oxidizer from the second pressure to a third pressure lower than the second pressure.

The method according to any preceding clause, wherein the at least one outlet orifice comprises a plurality of outlet orifices arranged through an aft wall of the swirler ferrule plate, and the third flow of the oxidizer is directed by the plurality of outlet orifices radially inward toward a tip of the fuel nozzle.

The method according to any preceding clause, further comprising providing a fourth flow of the oxidizer from the pressure plenum to the primary swirler, the primary swirler inducing a swirl in a primary swirl direction of the oxidizer into the primary swirler venturi, wherein the plurality of outlet orifices are further arranged to provide the third flow of the oxidizer to the primary swirler venturi directed in a co-swirl or counter-swirl direction with the primary swirl direction.

The method according to any preceding clause, wherein the first pressure drop comprises between ten percent and ninety percent of a total pressure drop through the swirler ferrule plate, and the second pressure drop comprises a remaining portion of the total pressure drop through the swirler ferrule plate.

The method according to any preceding clause, wherein the at least one outlet orifice comprises a plurality of outlet orifices each defined at the fuel nozzle opening of the swirler ferrule plate, and wherein an outer surface of the fuel nozzle forms a radially inward portion of each the outlet orifices.

The method according to any preceding clause, wherein the at least one outlet orifice comprises a plurality of outlet orifices, wherein the fuel nozzle comprises a plurality of fuel nozzle cavities, each of the plurality of fuel nozzle cavities being in fluid communication with the annular pressure drop cavity via a respective outlet orifice among the plurality of outlet orifices, wherein each fuel nozzle cavity includes a fuel nozzle outlet orifice providing fluid communication between the fuel nozzle cavity and the primary swirler venturi, and wherein the third flow of the oxidizer is provided from the annular pressure drop cavity to the primary swirler venturi via the fuel nozzle cavities and their respective fuel nozzle outlet orifice.

The method according to any preceding clause, wherein the at least one outlet orifice comprises an annular channel defined through the fuel nozzle opening, wherein the fuel nozzle comprises (i) an annular fuel nozzle cavity in a radially outer portion of the fuel nozzle, the annular fuel nozzle cavity being in fluid communication with the annular channel, and (ii) at least one fuel nozzle outlet orifice providing fluid communication between the annular fuel nozzle cavity and the primary swirler venturi, and wherein the third flow of the oxidizer is provided from the annular pressure drop cavity to the primary swirler venturi via the annular channel, the annular fuel nozzle cavity, and the at least one fuel nozzle outlet orifice.

The method according to any preceding clause, wherein the at least one fuel nozzle outlet orifice comprises an annular outlet orifice about the radially outer portion of the fuel nozzle.

Although the foregoing description is directed to some exemplary embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A swirler assembly of a combustor, the swirler assembly defining a swirler assembly centerline therethrough, the swirler assembly comprising:

a swirler including a primary swirler having a primary swirler venturi;

a swirler ferrule plate connected to an upstream side of the primary swirler and including a fuel nozzle opening extended therethrough along the swirler assembly centerline; and a fuel nozzle disposed in the fuel nozzle opening of the swirler ferrule plate, the swirler ferrule plate comprising:

(a) an aft wall extending radially outward from the fuel nozzle opening;

(b) an axial wall extending upstream from an upstream side of the aft wall at the fuel nozzle opening;

(c) an annular conical wall extending from a radially inward portion of the axial wall at the fuel nozzle opening, and extending radially outward upstream from the axial wall; and (d) an annular cavity wall connecting a radially outward portion of the aft wall and an upstream end of the annular conical wall enclosing, annular cavity between the aft wall, the axial wall, the annular conical wall, and the annular cavity wall, the annular cavity wall including a plurality of inlet orifices therethrough, wherein at least one of the aft wall and the axial wall includes at least one outlet orifice providing fluid communication between the annular cavity and the primary swirler venturi, and wherein a flow of an oxidizer through the plurality of inlet orifices into the annular cavity incurs a first pressure drop from a first pressure of a pressure plenum to a second pressure lower than the first pressure, and a flow of the oxidizer from the annular cavity through the at least one outlet orifice into the primary swirler venturi incurs a second pressure drop from the second pressure to a third pressure lower than the second pressure.

2. The swirler assembly according to claim 1, wherein the at least one outlet orifice comprises a plurality of outlet orifices arranged axially through the aft wall with respect to the swirler assembly centerline.

3. The swirler assembly according to claim 1, wherein the at least one outlet orifice comprises a plurality of outlet orifices arranged through the aft wall at a radially inward angle with respect to the swirler assembly centerline, from an upstream side of the aft wall to a downstream side of the aft wall, so as to direct the flow of the oxidizer therethrough toward a tip of the fuel nozzle.

4. The swirler assembly according to claim 3, wherein the primary swirler has a swirl direction and the plurality of outlet orifices are further arranged at an angle circumferentially in a co-swirl or counter-swirl direction with the swirl direction of the primary swirler.

5. The swirler assembly according to claim 1, wherein the first pressure drop comprises between ten percent and ninety percent of a total pressure drop through the swirler ferrule plate, and the second pressure drop comprises a remaining portion of the total pressure drop through the swirler ferrule plate.

6. The swirler assembly according to claim 1, wherein the at least one outlet orifice comprises a plurality of outlet orifices each defined adjacent to the fuel nozzle, wherein an outer surface of the fuel nozzle forms a passage with the aft wall for each of the plurality of outlet orifices.

7. The swirler assembly according to claim 1, wherein the at least one outlet orifice comprises a plurality of outlet orifices, wherein the fuel nozzle includes a plurality of fuel nozzle cavities on a radially outer portion of the fuel nozzle, each of the plurality of fuel nozzle cavities being in fluid communication with the annular cavity via a respective outlet orifice among the plurality of outlet orifices, and wherein each of the plurality of fuel nozzle cavities includes a fuel nozzle outlet orifice providing fluid communication between each of the plurality of fuel nozzle cavities and the primary swirler venturi.

8. The swirler assembly according to claim 1, wherein the at least one outlet orifice comprises an annular channel defined through the fuel nozzle opening of the swirler ferrule plate, and wherein the fuel nozzle comprises (i) an annular fuel nozzle cavity in a radially outer portion of the fuel nozzle, the annular fuel nozzle cavity being in fluid communication with the annular cavity via the annular channel, and (ii) at least one fuel nozzle outlet orifice providing fluid communication between the annular fuel nozzle cavity and the primary swirler venturi.

9. The swirler assembly according to claim 8, wherein the at least one fuel nozzle outlet orifice comprises an annular outlet orifice.

10. The swirler assembly according to claim 1, wherein the at least one outlet orifice comprises a plurality of rows of outlet orifices circumferentially arranged through the aft wall, each row of the plurality of rows of outlet orifices being arranged at a different radial distance from the swirler assembly centerline.

11. The swirler assembly according to claim 1, wherein the at least one outlet orifice comprises any one of a circular shaped orifice, a rectangular shaped orifice, a triangular shaped orifice, and a trapezoidal shaped orifice.

12. The swirler assembly according to claim 1, wherein the at least one outlet orifice is tapered from a first size at a forward surface of the aft wall to a second size at an aft surface of the aft wall, the first size being different from the second size.

13. A method of operating a combustor of a gas turbine, the combustor comprising (i) a pressure plenum, (ii) a swirler assembly including (a) a swirler having a primary swirler with a primary swirler venturi, and (b) a swirler ferrule plate connected to the primary swirler and including a fuel nozzle opening extended therethrough, and an annular pressure drop cavity formed by an aft wall extending radially outward from the fuel nozzle opening, an axial wall extending upstream from an upstream side of the aft wall at the fuel nozzle opening, an annular conical wall extending from a radially inward portion of the axial wall at the fuel nozzle opening and extending radially outward upstream from the axial wall, and an annular cavity wall connecting a radially outward portion of the aft wall and an upstream end of the annular conical wall, the annular pressure drop cavity having a plurality of inlet orifices in fluid communication with the pressure plenum and at least one outlet orifice in fluid communication with a primary swirler venturi region, and (iii) a fuel nozzle disposed in the fuel nozzle opening of the swirler ferrule plate, the method comprising:

providing a first flow of an oxidizer to the pressure plenum, the first flow of the oxidizer having a first pressure;

providing a second flow of the oxidizer from the pressure plenum to the annular pressure drop cavity of the swirler ferrule plate via the plurality of inlet orifices of the annular pressure drop cavity, the second flow of the oxidizer inducing a first pressure drop in the flow of the oxidizer from the first pressure to a second pressure lower than the first pressure in the annular pressure drop cavity; and providing a third flow of the oxidizer from the annular pressure drop cavity to a primary swirler venturi region via the at least one outlet orifice of the swirler ferrule plate, the third flow of the oxidizer inducing a second pressure drop in the flow of the oxidizer from the second pressure to a third pressure lower than the second pressure.

14. The method according to claim 13, wherein the at least one outlet orifice comprises a plurality of outlet orifices arranged through the aft wall of the swirler ferrule plate, and the third flow of the oxidizer is directed by the plurality of outlet orifices radially inward toward a tip of the fuel nozzle.

15. The method according to claim 14, further comprising providing a fourth flow of the oxidizer from the pressure plenum to the primary swirler, the primary swirler inducing a swirl in a primary swirl direction of the oxidizer into the primary swirler venturi, wherein the plurality of outlet orifices are further arranged to provide the third flow of the oxidizer to the primary swirler venturi directed in a co-swirl or counter-swirl direction with the primary swirl direction.

16. The method according to claim 13, wherein the first pressure drop comprises between ten percent and ninety percent of a total pressure drop through the swirler ferrule plate, and the second pressure drop comprises a remaining portion of the total pressure drop through the swirler ferrule plate.

17. The method according to claim 13, wherein the at least one outlet orifice comprises a plurality of outlet orifices each defined at the fuel nozzle opening of the swirler ferrule plate, and wherein an outer surface of the fuel nozzle forms a passage from a radially inward portion of each the outlet orifices.

18. The method according to claim 13, wherein the at least one outlet orifice comprises a plurality of outlet orifices, wherein the fuel nozzle comprises a plurality of fuel nozzle cavities, each of the plurality of fuel nozzle cavities being in fluid communication with the annular pressure drop cavity via a respective outlet orifice among the plurality of outlet orifices, wherein each of the plurality of fuel nozzle cavities includes a fuel nozzle outlet orifice providing fluid communication between each of the plurality of fuel nozzle cavities and the primary swirler venturi, and wherein the third flow of the oxidizer is provided from the annular pressure drop cavity to the primary swirler venturi via each of the plurality of fuel nozzle cavities and their respective fuel nozzle outlet orifice.

19. The method according to claim 13, wherein the at least one outlet orifice comprises an annular channel defined through the fuel nozzle opening, wherein the fuel nozzle comprises (i) an annular fuel nozzle cavity in a radially outer portion of the fuel nozzle, the annular fuel nozzle cavity being in fluid communication with the annular channel, and (ii) at least one fuel nozzle outlet orifice providing fluid communication between the annular fuel nozzle cavity and the primary swirler venturi, and wherein the third flow of the oxidizer is provided from the annular pressure drop cavity to the primary swirler venturi via the annular channel, the annular fuel nozzle cavity, and the at least one fuel nozzle outlet orifice.

20. The method according to claim 19, wherein the at least one fuel nozzle outlet orifice comprises an annular outlet orifice about the radially outer portion of the fuel nozzle.

* * * * *